(12) United States Patent
Krallmann et al.

(10) Patent No.: US 7,615,268 B2
(45) Date of Patent: Nov. 10, 2009

(54) TUBULAR SAUSAGE CASING WITH A YARN TIE HAVING A METAL INSERT AND A PROCESS FOR PRODUCTION THEREOF

(75) Inventors: Anton Krallmann, Bad Fallingbostel (DE); Heinrich Henze-Wethkamp, Walsrode (DE); Reinhold Bansner, Bomlitz (DE)

(73) Assignee: CaseTech GmbH, Walsrode (DE)

( * ) Notice: Subject to any disclaimer, the term of this patent is extended or adjusted under 35 U.S.C. 154(b) by 834 days.

(21) Appl. No.: 10/771,676

(22) Filed: Feb. 3, 2004

(65) Prior Publication Data
US 2004/0228952 A1    Nov. 18, 2004

(30) Foreign Application Priority Data
Feb. 11, 2003    (DE) ................ 103 05 580

(51) Int. Cl.
*A22C 13/00* (2006.01)
(52) U.S. Cl. .............. 428/34.8; 428/35.6; 428/35.7; 428/36.9; 57/238; 57/314; 452/35

(58) Field of Classification Search ........... 428/34.8, 428/35.6, 35.7, 36.9; 57/238, 314; 452/35
See application file for complete search history.

(56) References Cited

U.S. PATENT DOCUMENTS

| 5,236,726 A | * | 8/1993 | Lancaster | ......... 426/135 |
| 2004/0065072 A1 | * | 4/2004 | Zhu et al. | ......... 57/314 |

FOREIGN PATENT DOCUMENTS

| DE | 2512720 A | * 10/1976 |
| DE | 200 01 581 U1 | 3/2000 |

OTHER PUBLICATIONS

Mr. Gerhard Effenberger, Description regarding artificial sausage casing, $2^{nd}$ Edition, pp. 54 and 55, 1991.

* cited by examiner

*Primary Examiner*—Michael C Miggins
(74) *Attorney, Agent, or Firm*—Connolly Bove Lodge & Hutz LLP

(57) ABSTRACT

A description is given of a tubular artificial sausage casing and a process for preparing the same, characterized in that the sausage casing is closed at one end or two ends by a yarn having a metal insert.

10 Claims, No Drawings

TUBULAR SAUSAGE CASING WITH A YARN TIE HAVING A METAL INSERT AND A PROCESS FOR PRODUCTION THEREOF

BACKGROUND OF THE INVENTION

1. Field of the Invention

The invention relates to an artificial sausage casing which is closed with a yarn having a metal insert. More specifically, the invention is characterized in that the metal insert improves the closed sausage casing with respect to increased safety on stuffing and processing after stuffing regarding the knot's slipping off the pleated end, so that the clip which is otherwise necessary can be omitted.

2. Brief Description of the Invention

Of interest here are tubular films which are used as enclosure of pasty foods or non-foods. They are generally offered as cut pieces closed at one end which is provided with a loop. Generally, the closure of the cut piece is at the same time made of the same material as the loop itself. The yarn for the loop can consist of highly varied materials. Illustratively, "Wursthüllen Kunstdarm" [Sausage casings, artificial sausage casing], $2^{nd}$ Edition 1991 by Mr Gerhard Effenberger, pages 54 and 55, discloses yarns of cotton oriented polypropylene, polyamide or polyester and mixtures of various plastic types of material. The yarns can be used in the most varied constructions, e.g., braided, double, triple, six-fold or eight-fold twisted yarn or dyed, with or without a core.

As a variant for closing the cut piece, one can use clips which have been produced from aluminium or alloys thereof, which are individually shaped or have been produced from a wire during the process. Also useful for this application are plastic clips.

In the case of closing the cut piece with clips only, a loop must be further attached to suspend the sausage. This loop can be prefabricated or can be manufactured directly during the converting of the cut pieces. The yarn for the loop consists of the same materials as used for abovementioned loops.

Closure with a yarn is generally carried out using the ZD1 machine from VEB Verpackungsmaschinenbau Dresden, parent company of VEB Kombinat Nagema. The ZD1 machines, may contain, an automatic clipper which would enable a yarn closure with the corresponding loop and a clip closure, in one working operation.

DE-A-200 01 581 discloses a type of closure in which the end of a cut piece of an artificial sausage casing has been turned over in a region of 2 cm, pleated and closed with a yarn which connects to this turned over edge. Turning the skin over achieves a higher security against the knot slipping off.

In the abovementioned publication "Wursthüllen Kunstdarm" a yarn closure is described in which the end of a cut piece has been turned over in a larger region of 3 cm, pleated, and closed with a yarn which is mounted on this turned-over region. Incorporating the casing beneath the knot achieves still more security against the knot slipping off.

There are also ties used, which consist of a combination of yarn and the corresponding loop and an additional clip, which are both independently of one another mounted on the closed end of a tie. In this case, the yarn, with the loop, performs the closure of the cut piece of the artificial casing. The clip is placed behind the loop, that is to say between the end of the cut piece and the loop. The clip serves the following purpose: when applying a load to the loop, the knot can only slip up to the clip. (safety clip).

This clip closure is carried out in the above described ZD1 machines with a built-in automatic clipper, so that a closure of yarn with the corresponding loop and a clip closure can be produced in one working operation.

In certain countries, particular value is placed on the detectability of foreign bodies, such as metals, in the sausage. By means of the metal insert, the yarn can then be detected using corresponding detectors.

The yarn types listed have the disadvantage that they are elastic in a relatively large range. This is manifested in a knot always loosening slightly when knot is being tightened, and after the tightening force has been removed. Furthermore, when the cut piece of the artificial casing is being processed, the knot is stressed, so that loosening it can occur here also.

Before the casings are stuffed with sausage mix, they must usually be soaked for approximately 30 minutes, so that the sausage casing becomes sufficiently elastic for the stuffing process. The moisture absorption of the sausage casing causes, for example in the case of cellulose fibrous sausage casing, swelling, under the knot, so that an additional tension is built up on the knot. This tension causes an additional loosening of the knot. Also, the yarn itself, by the moisture absorption, undergoes a change in length and/or decreased mechanical properties, depending on the yarn type, which damages the stability of the knot.

After the cut pieces are stuffed, they are closed on the other side and the stuffed cut pieces are suspended on the loop on what are termed spits. On the transport racks, the suspended sausages are pushed into the cooking chamber and, in the case of scalded-emulsion and cooked-meat sausages, are customarily cooked at temperatures of approximately 70-90° C.

In addition, the temperature stress on cooking also leads to an expansion of the yarn and thus to a loss of strength.

The safe closure of cut pieces of sausages and safety against the knot slipping off during processing of the sausage creates a high demand for the type of closure. In particular, this is required in the case of long pieces, for example from lengths from 1.5 m or in general also in the case of large calibres (greater than calibre 75). In addition to high weight, frequently very high and pulsating stuffing pressures are used during the stuffing process. High demands of the reliability against the knot slipping off are also made in the case of sausage casings having a readily sliding or slippery surface. Examples which may be mentioned here are externally coated fibrous sausage casing types, lacquered textile sausage casings and plastic sausage casings. When these sausage casing types are printed with a full-surface printing with commercially conventional two-component colours, this demand further increases.

It was an object of the invention to choose a type of closure which withstands these high pulsating stuffing pressures and also is strong enough during the further processing of the stuffed sausage that the closure, during stuffing and further processing of the sausage, remains at the same point and thus offers sufficient safety against slipping off.

SUMMARY OF THE INVENTION

The object of this invention has been achieved by using yarn having a metal insert. The yarn comprises a plastic type of material suitable therefor, which has a solid insert of metal. The insert can be a member selected from the group consisting of one or more individual wires or many thin wires. The material therefor can be stainless steel, aluminium, copper or other metal. When this yarn type is used, the desired safety is provided.

A combination of metal filaments and complete enclosure by plastic is also conceivable, for example in the case of cables, where one or more metal filaments are enclosed as a whole with plastic.

The invention therefore relates to an artificial sausage casing characterized in that the sausage casing is closed at one end or two ends with a yarn having a metal insert.

Surprisingly, the sensitive sausage casing material is not damaged on contact with the metal in association with the high tightening force, and in addition the connection between the knot and the cut piece of the sausage casing is so stable that all requirements of the knot are met.

DETAILED DESCRIPTION OF THE INVENTION

The inventively used yarn comprises twisted polyester yarn, for example, having three filaments, and in each of these filaments, a metal insert of 0.1 mm to 0.5 mm-thick wire filament made of stainless steel, copper, aluminium, iron or tin, preferably stainless steel, is inserted. A particularly, highly suitable yarn is a braided yarn which has the metal filament in the centre that is to say in the core of the yarn.

Other suitable yarn types are those whose core comprises combination of a metal insert and a plastic filament. In this case the yarns, in addition to drawn polyester yarns, can also comprise of cotton or drawn polypropylene, polyamide or mixtures of various plastic yarn types. Astonishingly, the yarn in accordance with the invention was able to be processed on a conventional sausage casing tying machine, for example type ZD1 from the company VEB Verpackungsmaschinenbau Dresden, parent company of VEB Kombinat Nagema without changing the production parameters compared with yarn without a metal insert. The yarn having the metal insert possesses virtually the same sliding and static friction properties as the yarn without a metal insert and can be separated by hand from the machine using customary means (knife, shears, tongs).

Particular preference is given to the following artificial sausage casing types which are closed according to the invention as a tubular sausage casing by a yarn having a metal insert: cellulose fibrous sausage casing, cellulose fibrous sausage casing with coating, uncoated and coated textile sausage casing, plastic sausage casing and collagen sausage casing. All of the artificial sausage casings listed can in turn be printed on the whole surface with commercially conventional printing inks using one colour, or else using two colours, or only in sections.

The invention further relates to a process for producing a artificial tubular sausage casing closed at one end or two ends in which the sausage casing is closed at one end or at two ends by a yarn having a metal insert.

The inventive process can be carried out on a conventional sausage casing tying machine, as already mentioned above.

The invention further relates to a sausage product which consists of stuffing and a sausage casing which is closed at one end or two ends by a yarn having a metal insert.

In the illustrative but non-limiting examples below, the good behaviour of the inventively produced tie will be demonstrated.

EXAMPLES

Example 1

A cellulose fibrous casing Walsroder® FEL calibre 170 available from CaseTech GmbH & Co KG in a length of 0.6 m is tied in accordance with specifications using the braided yarn having a core of metal and polyester using the tie above and 20 cut pieces are stuffed.

Comparative Example: 1

The sausage casing specified under Example 1 in a length of 0.6 m is tied using usual yarn (PES triple yarn (yarn manufacturer Füssner Textil AG) using tie of type 5.5/3, PPS of strength 32-36 daN) and 20 cut pieces are stuffed.

Example 2

A plastics sausage casing Walsroder® K flex 75 white available from CaseTech GmbH & Co KG, in a length of 1 m, is tied in accordance with specifications (see Example 1) using the above tie and 20 cut pieces are stuffed.

Comparative Example: 2

A plastics sausage casing Walsroder® K flex 75 white, in a length of 1 m, is tied with usual yarn (see comparative Example 1) and 20 cut pieces are stuffed.

Example 3

An externally coated cellulose fibrous casing Walsrodere® FVP calibre 75 available from CaseTech GmbH & Co KG, in a length of 0.6 m, is tied in accordance with specifications with usual yarn (see Example 1) using the above tie and 20 cut pieces are stuffed.

Comparative Example: 3

An externally coated cellulose fibrous casing Walsrodere® FVP calibre 75, in a length of 0.6 m, is tied in accordance with specifications with usual yarn, (see comparative Example 1) and 20 cut pieces are stuffed.

Example 4

An internally coated cellulose fibrous casing Walsroder® F plus calibre 75 available from CaseTech GmbH & Co KG, in a length of 0.6 m, is tied n accordance with specifications with usual yarn (see Example 1) using the above tie and 20 cut pieces are stuffed.

Comparative Example: 4

An internally coated cellulose fibrous casing Walsroder® F plus calibre 75, in a length of 0.6 m, is tied with usual yarn, (see comparative Example 1) and 20 cut pieces are stuffed.

Example 5

An externally coated textile sausage casing Rotex calibre 60 available from OSKUDA® Kunst-Darm GmbH & Co. KG, in a length of 0.6 m, is tied in accordance with specifications (see Example 1) using the above tie and 20 cut pieces are stuffed.

Comparative Example: 5

An externally coated textile sausage casing Rotex calibre 60 in a length of 0.6 m, is tied f using usual yarn (see comparative Example 1) and 20 cut pieces are stuffed.

Test Criteria

1. Security against the knot's slipping off during stuffing
   The cut pieces are stuffed with scalded-emulsion sausage mix under production conditions and, after stuffing, the position of the knot on the tubular casing is assessed compared with the position before stuffing. A cut piece having an unsecure knot is classed as a cut piece in which the seat of the knot during the stuffing operation or after the stuffing operation is shifted by more than 2 mm on the tubular casing.

2. Security against the knot's slipping off during scalding, static

The stuffed sausages are cooked under production conditions, suspended, up to a core temperature of 72° C. After the scalding operation an assessment is made as to how high is the share of sausages in which the knot has slipped by more than 2 mm.

3. Security against the knot's slipping off after scalding, dynamic

Especially when the rack having the sausages is transported front the, scalding chamber, a dynamic load is applied to the knot. This dynamic load case is reproduced in a shaking test. For this, the spit together with the sausage suspended thereon is allowed to drop from a height of approximately 5 cm onto the transport rack. After the loading, an assessment is made as to how high is the proportion of sausages in which the knot has slipped by more than 2 mm.

Of each 20 cut pieces, the seat of the knot has slipped by more than 2 mm.

|  | 1<br>1. Security against the knot's slipping off during stuffing | 2<br>2. Security against the knot's slipping off during scalding, static | 3<br>3. Security against the knot's slipping off during scalding, dynamic | 4<br>Total from columns 1-3 |
|---|---|---|---|---|
| Example 1 | 0 | 0 | 1 | 1 |
| Comparative Example 1 | 1 | 5 | 10 | 15 |
| Example 2 | 1 | 3 | 1 | 5 |
| Comparative Example 2 | 2 | 5 | 2 | 9 |
| Example 3 | 0 | 1 | 2 | 3 |
| Comparative Example 3 | 2 | 7 | 2 | 11 |
| Example 4 | 0 | 0 | 0 | 0 |
| Comparative Example 4 | 0 | 3 | 4 | 7 |
| Example 5 | 0 | 1 | 1 | 2 |
| Comparative Example 5 | 0 | 2 | 3 | 5 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. Tubular artificial sausage casing, characterized in that the sausage casing is closed at one end or two ends by a yarn having a metal insert core.

2. Sausage casing according to claim 1, characterized in that an apparatus for suspending the sausage casing is formed from the yarn having a metal insert.

3. Sausage casing according to claim 1, characterized in that the tubular casing is a sausage casing setected from the group consisting of cellulose fibrous sausage casing, cellulose fibrous sausage casing with coating, uncoated and coated textile sausage casing, plastic sausage casing and collagen sausage casing.

4. Sausage product comprising the sausage casing according to claim 1 and stuffing.

5. Sausage casing according to claim 1, characterized in that the metal insert is selected from the group consisting of steel, copper, aluminium, iron and tin.

6. Sausage casing according to claim 5, wherein the metal insert consists of 1 to 10 metal filaments.

7. Sausage casing according to claim 6, wherein the metal filaments have a diameter of 0.01 to 0.5 mm.

8. Sausage casing according to claim 1, characterized in that the metal insert consists of 1 to 10 metal filaments.

9. Sausage casing according to claim 8, characterized in that the metal filaments have a diameter of 0.01 to 0.5 mm.

10. Process for producing a tubular artificial sausage casing closed at one end or two ends, comprising closing the sausage casing at one end or two ends by a yarn having a metal insert core.

* * * * *